US009817869B2

(12) United States Patent
Aradhye et al.

(10) Patent No.: US 9,817,869 B2
(45) Date of Patent: *Nov. 14, 2017

(54) SYSTEMS AND METHODS FOR PRIORITIZING NOTIFICATIONS ON MOBILE DEVICES

(71) Applicant: Google Inc., Mountain View, CA (US)

(72) Inventors: Hrishikesh Aradhye, Santa Clara, CA (US); Wei Hua, Palo Alto, CA (US); Ruei-Sung Lin, Redwood City, CA (US); Mohammed Saberian, La Jolla, CA (US)

(73) Assignee: Google LLC, Mountain View, CA (US)

(*) Notice: Subject to any disclaimer, the term of this patent is extended or adjusted under 35 U.S.C. 154(b) by 651 days.

This patent is subject to a terminal disclaimer.

(21) Appl. No.: 14/258,996

(22) Filed: Apr. 22, 2014

(65) Prior Publication Data

US 2014/0229880 A1    Aug. 14, 2014

Related U.S. Application Data

(63) Continuation of application No. 13/648,972, filed on Oct. 10, 2012, now Pat. No. 8,707,201.

(Continued)

(51) Int. Cl.
| | |
|---|---|
| G06F 3/048 | (2013.01) |
| G06F 17/30 | (2006.01) |
| G06F 3/0481 | (2013.01) |
| G06F 3/0482 | (2013.01) |
| G06Q 10/10 | (2012.01) |
| H04L 12/58 | (2006.01) |

(52) U.S. Cl.
CPC ........ *G06F 17/3053* (2013.01); *G06F 3/0481* (2013.01); *G06F 3/0482* (2013.01);
(Continued)

(58) Field of Classification Search
CPC ... G06F 3/0481; G06F 3/0482; G06Q 10/107; H04L 51/38; H04L 51/24; H04L 51/26
See application file for complete search history.

(56) References Cited

U.S. PATENT DOCUMENTS

| | | | |
|---|---|---|---|
| 6,654,787 B1 * | 11/2003 | Aronson | ................. H04L 51/12 |
| | | | 707/999.003 |
| 7,069,259 B2 | 6/2006 | Horvitz et al. | |

(Continued)

*Primary Examiner* — William Bashore
*Assistant Examiner* — Gregory A Distefano
(74) *Attorney, Agent, or Firm* — Colby Nipper (57) ABSTRACT

Certain embodiments of the disclosed technology include systems and methods for determining the priority of a notification on a mobile device using machine learning. Other aspects of the disclosed technology include selectively displaying notifications based on the priority of a notification. According to an embodiment of the disclosed technology, a computer-implement method is provided that comprises outputting, to a display device operatively coupled to a mobile device, a plurality of notifications, wherein each respective notification from the plurality of notifications is associated with a respective priority score; modifying, by the mobile device, a ranking model based on a user input received responsive to a first notification from the plurality of notifications and a characteristic of a second notification from the plurality of notifications; determining, by the mobile device, a priority score associated with a third notification based on the modified ranking model; and outputting, to the display device, the third notification based on the priority score associated with the third notification, wherein the third notification is graphically emphasized responsive to the priority score associated with the third notification being greater than at least one respective priority score associated with a corresponding respective notification from the plurality of notifications.

19 Claims, 5 Drawing Sheets

Related U.S. Application Data

(60) Provisional application No. 61/665,289, filed on Jun. 27, 2012.

(52) U.S. Cl.
CPC ........... G06Q 10/107 (2013.01); H04L 51/24 (2013.01); H04L 51/26 (2013.01); H04L 51/38 (2013.01)

(56) References Cited

U.S. PATENT DOCUMENTS

| | | | |
|---|---|---|---|
| 7,523,397 B2 | 4/2009 | Cheung et al. | |
| 7,895,273 B1 * | 2/2011 | Haldar | G06Q 10/10 370/229 |
| 8,131,786 B1 | 3/2012 | Bengio et al. | |
| 2001/0035881 A1 | 11/2001 | Stoakley et al. | |
| 2002/0054117 A1 * | 5/2002 | van Dantzich | G06F 3/0482 715/766 |
| 2002/0087649 A1 * | 7/2002 | Horvitz | G06Q 10/107 709/207 |
| 2003/0014490 A1 * | 1/2003 | Bates | G06Q 10/107 709/206 |
| 2003/0025599 A1 | 2/2003 | Monroe | |
| 2006/0010217 A1 * | 1/2006 | Sood | H04L 51/12 709/206 |
| 2006/0133586 A1 | 6/2006 | Kasai et al. | |
| 2007/0054640 A1 | 3/2007 | Wada et al. | |
| 2008/0207188 A1 | 8/2008 | Ahn et al. | |
| 2012/0323933 A1 * | 12/2012 | He | G06Q 10/109 707/749 |

* cited by examiner

SYSTEMS AND METHODS FOR PRIORITIZING NOTIFICATIONS ON MOBILE DEVICES

CROSS-REFERENCE TO RELATED APPLICATIONS

This Application is a continuation application claiming priority under 35 U.S.C. §120 to U.S. Nonprovisional patent application Ser. No. 13/648,972, filed Oct. 10, 2012, which claims priority under 35 U.S.C. §119 to U.S. Provisional Patent Application No. 61/665,289 filed 27 Jun. 2012. The entire contents and substance of both of these priority applications is incorporated by reference as if fully set out below.

BACKGROUND

Mobile devices often receive vast amounts of data from various applications, such as text messages (for example, through Short Message Service (SMS) or Multimedia Message Service (MMS)), emails, phone calls, calendar alerts, geo-location alerts, voicemails, and third-party applications. Some mobile devices alert users to newly-received data through a "notification" that an event has occurred or that new information is available. For example, if a mobile device receives two new text messages, and an application message, the mobile device can display notifications that the new text messages and application message have been received (as opposed to displaying the actual messages). In some instances, one or more of the notifications can provide at least a preview of the received messages. Such notifications provide the user with a summary or overview of the data being received or provided to the user, and are often presented in chronological or reverse-chronological order.

Due to the increasing number of notifications provided by applications, users of mobile devices are often presented with an extensive amount of information at any given time. Some recent mobile device systems allow users to manually assign priority levels to certain notifications and thereby change the order in which notifications are presented.

Many known systems and devices, however, lack the ability to intelligently present notifications based on their importance to a specific user, and without requiring the user to manually program such settings.

SUMMARY

The deficiencies described above are remedied by certain embodiments of the disclosed technology, which include systems and methods for determining the priority of a notification on a mobile device using machine learning. Certain aspects of the disclosed technology include selectively displaying or outputting notifications based on their priority.

According to an embodiment of the disclosed technology, a computer-implement method is provided that comprises outputting, to a display device operatively coupled to a mobile device, a plurality of notifications, wherein each respective notification from the plurality of notifications is associated with a respective priority score. In an embodiment, the method includes modifying, by the mobile device, a ranking model based on a user input received responsive to a first notification from the plurality of notifications and a characteristic of a second notification from the plurality of notifications. In an embodiment, the method includes determining, by the mobile device, a priority score associated with a third notification based on the modified ranking model. In an embodiment, the method includes outputting, to the display device, the third notification based on the priority score associated with the third notification, wherein the third notification is graphically emphasized responsive to the priority score associated with the third notification being greater than at least one respective priority score associated with a corresponding respective notification from the plurality of notifications.

According to another embodiment of the disclosed technology, a computer-implemented method is provided that comprises outputting, to a display device operatively coupled to a mobile device, a plurality of notifications, wherein each respective notification from the plurality of notifications is associated with a respective priority score. In an embodiment, the method includes modifying, by the mobile device, a ranking model based on a user input received responsive to a first notification from the plurality of notifications. In an embodiment, the method includes determining, by the mobile device, a priority score associated with a second notification based on the modified ranking model. In an embodiment, the method includes outputting, to the display device, the second notification based on the priority score associated with the second notification, wherein the second notification is graphically emphasized responsive to the priority score associated with the second notification being greater than at least one respective priority score associated with a corresponding respective notification from the plurality of notifications.

According to another embodiment of the disclosed technology, a system is provided that comprises a mobile device, operatively coupled to a display device, configured to: output to said display device a plurality of notifications, wherein each respective notification from the plurality of notifications is associated with a respective priority score. In an embodiment, the mobile device is configured to modify a ranking model based on a user input received responsive to a first notification from the plurality of notifications. In an embodiment, the mobile device is configured to determine a priority score associated with a second notification based on the modified ranking model. In an embodiment, the mobile device is configured to output to said display device the second notification based on the priority score associated with the second notification, wherein the second notification is graphically emphasized responsive to the priority score associated with the second notification being greater than at least one respective priority score associated with a corresponding respective notification from the plurality of notifications.

According to another embodiment of the disclosed technology, a non-transitory computer-readable storage medium with an executable program stored thereon is provided, wherein the program instructs a data processor to perform the following steps: output to a display device a plurality of notifications, wherein each respective notification from the plurality of notifications is associated with a respective priority score. In an embodiment, the program instructs the data processor to modify a ranking model based on a user input received responsive to a first notification from the plurality of notifications. In an embodiment, the program instructs the data processor to determine a priority score associated with a second notification based on the modified ranking model. In an embodiment, the program instructs the data processor to output to said display device the second notification based on the priority score associated with the second notification, wherein the second notification is graphically emphasized responsive to the priority score associated with the second notification being greater than at least one respective priority score associated with a corresponding respective notification from the plurality of notifications.

Other embodiments, features, and aspects can be understood with reference to the following detailed description, accompanying drawings, and claims.

BRIEF DESCRIPTION OF THE FIGURES

Reference will now be made to the accompanying figures and flow diagrams, which are not necessarily drawn to scale, and wherein.

DETAILED DESCRIPTION

Embodiments of the disclosed technology will be described more fully hereinafter with reference to the accompanying drawings, in which certain embodiments of the disclosed technology are shown. This disclosed technology may, however, be embodied in many different forms and should not be construed as limited to the embodiments set forth herein.

In the following description, numerous specific details are set forth. However, it is to be understood that embodiments of the disclosed technology may be practiced without these specific details. In other instances, well-known methods, structures and techniques have not been shown in detail in order not to obscure an understanding of this description. References to "one embodiment," "an embodiment," "various embodiments," etc., indicate that the embodiment(s) of the disclosed technology so described may include a particular feature, structure, or characteristic, but not every embodiment necessarily includes the particular feature, structure, or characteristic. Further, repeated use of the phrase "in one embodiment" does not necessarily refer to the same embodiment, although it may.

As used herein, unless otherwise specified the use of the ordinal adjectives "first," "second," "third," etc., to describe a common object, merely indicate that different instances of like objects are being referred to, and are not intended to imply that the objects so described must be in a given sequence, either temporally, spatially, in ranking, or in any other manner.

Certain embodiments of the disclosed technology include systems and methods for determining the priority of a notification on a mobile device using machine learning. In one embodiment, notifications are output to a display of a mobile device, where each notification has a respective priority score associated with it. Based on the user's interactions with an output notification, the mobile device modifies a ranking model. The ranking model, described in further detail below, is used to prioritize notifications. For example, if a user clicks on a text message notification from John, the system may modify the ranking model such that text message notifications from John are given a higher priority score. Notifications with a higher priority score are considered more important or of higher priority than notifications with a lower priority score. Continuing with the example, if the text message notification from John is closed (without selecting to view the text message), the ranking model may be modified such that text messages from John are given a lower priority score.

Optionally, the mobile device may additionally base the modifications to the ranking model on the other notifications that are output when the user interacts with the notification. For example, if the mobile device outputs a text message notification and a voicemail notification, and the user selects the voicemail notification, the mobile device will modify the ranking model taking into consideration that the voicemail notification was selected while the text message notification that was output at the same time was not. Accordingly, the ranking model may have a relational aspect; e.g., voicemail notifications are more important than text message notifications. As described further below, the source application associated with a notification is one of many notification characteristics that modifications to the ranking model may be based on.

Before a new notification is output by the mobile device, the mobile device will determine the priority score of the new notification based on the modified ranking model. The new notification is then output based on this determined priority score, such that the new notification is graphically emphasized if the priority score associated with it is greater than at least one of the priority scores associated with the other output notifications. As an example, a text message notification associated with Jane is output, and a new text message notification associated with John is received. If the text message notification associated with John has a higher priority score than the text message notification associated with Jane, then the text message notification associated with John will be graphically emphasized, for example, by bolding the notification. As described further below, the notification may be graphically emphasized in a number of different ways.

Figure 1:
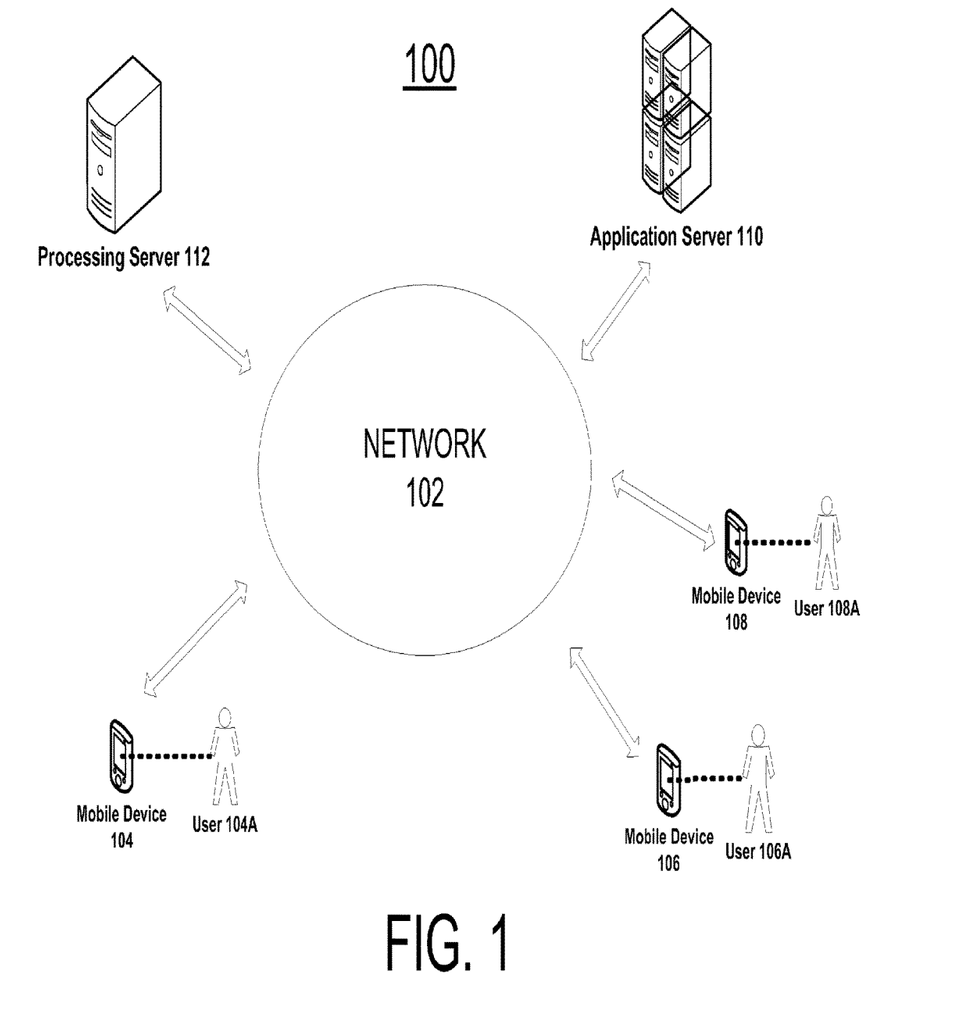
FIG. 1 is a block diagram of a notification prioritization system environment, according to certain embodiments of the disclosed technology.

FIG. 1 illustrates a notification prioritization system 100 in accordance with certain embodiments. In one embodiment, one or more mobile devices 104, 106, 108 may be in communication with network 102. Although only three mobile devices are shown, it should be understood that more than three mobile devices may be in communication with network 102 and part of system 100. Network 102 may include a local area network, a wide area network, the internet, etc. The mobile devices 104, 106, 108 may communicate with the network 102 wirelessly or via wired connections. According to one embodiment, mobile devices 104, 106, 108 include a central processing unit and a display. The particular hardware components of the mobile device are described in further detail in FIG. 3. Each respective mobile device 104, 106, 108 is utilized by a respective user 104A, 106A, 108A. For example, users 104A, 106A, 108A are able to view and interact with the display of their respective mobile devices. The many applications and uses for mobile devices are well known in the art, for example, phone calls, text messages, emails, and third party applications. In certain embodiments, application server 110 manages certain portions of mobile device applications. For example, an instant messaging service may provide a third party application that can be downloaded onto a mobile device. This instant messaging service may provide "push" notifications or deliver select data to mobile device 104 through application server 110. It should be understood that the application server may service both third party application and/or manufacturer/operating system native applications. In one embodiment, some or all of the processing for the notification prioritization is performed at the processing server 112. For example, the processing server 112 may perform the calculations to modify the ranking model or determine the priority score of a notification. As understood by one skilled in the art, these calculations may also be performed locally by the mobile device's central processing unit. It should be understood that application server 110 and processing server 112 may comprise one or more computers, and may be part of a cloud computer system.

Figure 2:
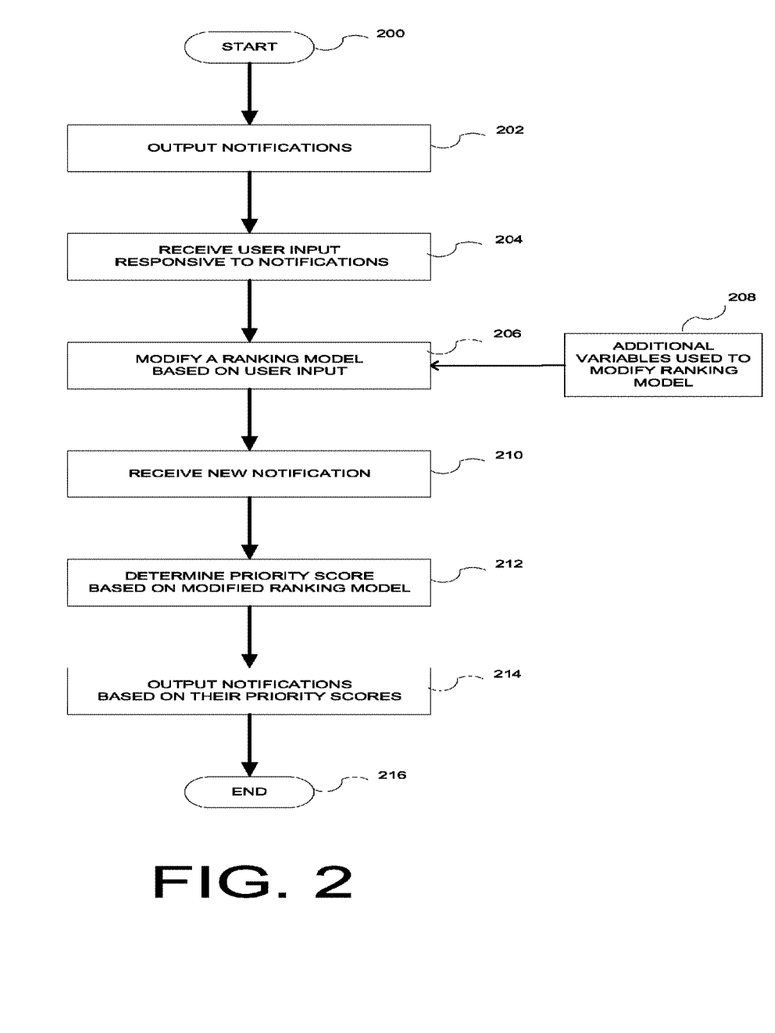
FIG. 2 is flow diagram of a notification prioritization method, according to certain embodiments of the disclosed technology.

FIG. 2 depicts a flowchart illustrating a method for prioritizing notifications, according to an embodiment. At step 200, the process starts and then proceeds to outputting application notifications to a display, step 202. These notifications may be provided by applications native to the mobile device or operating system, such as telephone applications, calendar applications, or text messaging applications. The notifications may also be provided by third party applications, for example, a social networking application or instant messaging application. In one embodiment, all notifications are output to a centralized "notification center" so a user can access or view all notifications in a single location. In one embodiment, the output notifications are prioritized before being output, by applying the data or characteristics associated with each respective notification being output to a ranking model. In one embodiment, the output of the ranking model is a priority score, in which the higher (or lower) the score, the higher the priority relative to a notification with a lower priority score. The notifications are output to the display screen based on their priority score.

At step 204, the mobile device receives user input responsive to the output notifications. The user input may be, for example, an absence of user interaction with a notification, a selection of a notification, or a dismissal of a notification. An absence of interaction with a notification may indicate a neutral response to that notification. A selection of the notification, in order to view the complete data associated with the notification, may indicate a positive response to that notification (e.g., the user considers that notification important). An instruction to the mobile device to dismiss the notification, or remove it from the list of notifications being output without accessing the complete data associated with the notification, may indicate a negative response to that notification (e.g., the user considers that notification unimportant).

The ranking model is modified, at step 206, based on the user input received at step 204. For example, the ranking model is updated based on whether a neutral, positive, or negative response to a notification was received, and one or more characteristics of that notification. In one embodiment, no modification to the ranking model is made if a neutral response is received. Characteristics of the notification may include, but are not limited to, the source application of the notification, the sender of the data associated with the notification (sender's name and/or number and/or identification code), the time the notification or data associated with the notification was received or sent, the priority score of the notification, and the notification content (for example, the text or image of the notification or associated data). To continue with the example, if a text message notification associated with a text message received from Jane at 5:00 pm is selected (a positive indication), the ranking model may be updated such that notifications are given a higher priority score when they are associated with Jane, received at or around 5:00 pm, and/or are associated with text messages (or any combination thereof, such as text messages received at or around 5:00 pm). Accordingly, by understanding that the user's selection of the text message notification associated with the text message from Jane indicates that the notification was important to the user, the system is able to automatically prioritize related notifications (based on one or more characteristics of the notification), such that the related notifications will receive priority scores properly reflecting their importance to the user.

In one embodiment, the system will take into consideration additional variables in modifying the ranking model, step 208. In one such embodiment, the ranking model is modified based on: 1) a user's interaction with an output notification and one or more characteristics of that notification, and 2) also based on a characteristic of another notification that is also being output at the same time. For example, a characteristic is the application source. A mobile device outputs a text message notification and a phone call notification, and a user selects the text notification. The modification to the ranking model takes into account both the user's positive interaction with the text message notification, and the fact that the user was interacting with the text message notification while the phone call notification was being displayed—indicating that text message notifications are more important than phone call notifications. As another example, the characteristic is the sender. Two text message notifications are being output; one notification associated with a text message from John and another notification associated with a text message from Steve. The user selects the notification associated with John's text message. The update to the ranking model takes into account that John's message notification was selected over Steve's message notification, and thus, text message notifications associated with John are relatively more important than those associated with Steve.

The modification to the ranking model may further be based on the time at which the user input is received. Additionally, the modification to the ranking model may also be further based on the location of the mobile device when the user input is received, for example, as determined by a global positioning system receiver contained in the mobile device or other positioning means.

At step 210, a new notification is received, and a priority score is determined based on the modified ranking model, step 212. The new notification is then output based on its priority score, step 214. In one embodiment, when the new notification has a priority score greater than at least one of the priority scores associated with the notifications being output, the new notification will be graphically emphasized. Typically, notifications are presented as a listing of graphics ordered chronologically accordingly to when they were received. In one embodiment, graphical emphasis of the new notification is changing the respective position of the graphic representing the new notification within the listing of graphics. For example, if the new notification is determined to have a higher priority score than one of the two other notifications being output, the graphic associated with the new notification may be placed in the middle of the list (in other words, higher than the notification with a lower priority score, but lower than the notification with a higher priority score). Notifications may also be graphically emphasized by enlarging some or all of the graphic associated with the notification, bolding the text associated with the notification, or changing the color of the notification. In one embodiment, notifications are graphically emphasized by being displayed in a special high priority section of a notification center. Various other means of graphically emphasizing notifications will be known to one skilled in the art. At step 216, the process ends.

In certain embodiments, the priority score determination is based, in part, on the orientation of the mobile device. For example, if the device is in landscape mode, notifications associated with text messages may be given a higher priority score. In certain embodiments, the priority score determination is based, in part, on the application currently or previously accessed by the user. For example, if the user is currently accessing, or has recently accessed, her text messaging application, notifications associated with text messages may be given a higher priority.

The ranking model is updated based on passive user interactions, in various embodiments of the disclosed technology. In other words, the user does not need to actively or affirmatively input her notification priority preferences into the system; rather, the system uses machine learning techniques on the user input/interactions with the notifications to predict or estimate the priority of notifications for a given user. In one embodiment, this machine learning includes characteristic extraction of each notification, where each notification is represented as a characteristic vector. Characteristics of the notifications may include, but are not limited to, the source application of the notification, the sender of the data associated with the notification (sender's name and/or number and/or identification code), the time the notification or data associated with the notification was received or sent, the priority score of the notification, and the notification content (for example, the text or image of the notification or associated data). Ground truthing may then be performed, using the user interaction with the notifications to annotate characteristic vectors. A user selecting a notification is a positive indication compared to all unselected notifications preceding the selected notification in the same instance of the notification listing or notification center. Closing or "sliding out" a notification is a negative indication. And no action to a notification is a neutral signal. The next step is training. In one embodiment, the data is represented as an online ranking problem, and pairs of notifications are constructed where one of the notifications is annotated to be more important that the other. Using the ground truthing rules, the system may be trained using an incremental ranker, such as passive-aggressive model for image retrieval (PAMIR), or other appropriate machine learning algorithm. In one embodiment, a Stochastic Linear Ranker learning algorithm is utilized which uses pair-wise input data to train the ranking model.

In one embodiment, the priority notification system may include user reinforcement. That is, in addition to the unobtrusive machine learning of priority, the system may receive explicit user feedback where the user informs the prioritization to be correct or incorrect. This reinforcement feedback can be used as a strong signal for ranking model modifications.

In one embodiment, a classification-based priority score is used. That is, a binary indication of whether a notification is important or not important is used, as opposed to a broad ranged priority score.

Various embodiments of the communication systems and methods herein may be embodied in non-transitory computer readable media for execution by a data processor. In certain embodiments, a mobile device is used, such as a smartphone or tablet, but other computing devices may also be used.

Figure 3:
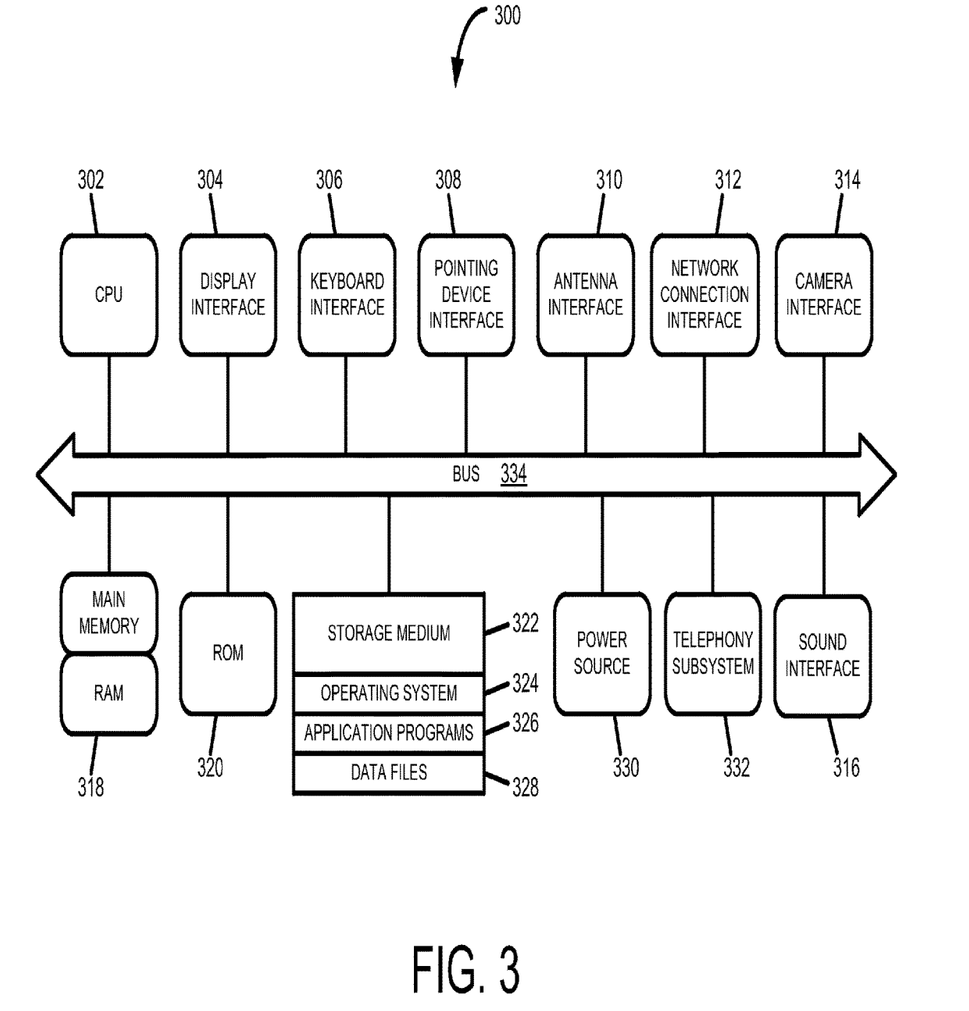
FIG. 3 is a block diagram of an illustrative mobile device, according to certain embodiments of the disclosed technology.

FIG. 3 depicts a block diagram of the architecture of mobile device 300 (for example, corresponding to mobile devices 104, 106, 108 in FIG. 1) according to an embodiment of the disclosed technology. Certain aspects of FIG. 3 may also be embodied in an external system (for example, processing server 112 or application server 110).

Mobile device 300 includes a central processing unit (CPU) 302, where computer instructions are processed; a display interface 304 that acts as a communication interface and provides functions for rendering video, graphics, images, and texts on the display; a keyboard interface 306 that provides a communication interface to a keyboard; and a pointing device interface 308 that provides a communication interface to a pointing device or a presence sensitive display such as a touch screen. As understood by one skilled in the art, display interface 304, keyboard interface 306, and pointing device interface 308 may be embodied in a single unit, such as a presence sensitive display or touch screen. Additionally, display interface 304 may comprise a display screen that is integrated into a device, such as a cell phone with an integrated screen, or the display screen may be separate from the device. Various embodiments of the methods described herein may be embodied in non-transitory computer readable media, such as storage medium 322, for execution by CPU 302. Embodiments of the mobile device 300 may include an antenna interface 310 that provides a communication interface to an antenna; a network connection interface 312 that provides a communication interface to a network. In certain embodiments, a camera interface 314 is provided that acts as a communication interface and provides functions for capturing digital images from a camera. In certain embodiments, a sound interface 316 is provided as a communication interface for converting sound into electrical signals using a microphone and for converting electrical signals into sound using a speaker. According to various embodiments, a random access memory (RAM) 318 is provided, where computer instructions and data are stored in a volatile memory device for processing by the CPU 302.

According to an embodiment, the mobile device 300 includes a read-only memory (ROM) 320 where invariant low-level systems code or data for basic system functions such as basic input and output (I/O), startup, or reception of keystrokes from a keyboard are stored in a non-volatile memory device. According to an embodiment, the mobile device 300 includes a storage medium 322 or other suitable type of memory (e.g. such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, flash drives), where the files include an operating system 324, application programs 326 (including, for example, a web browser application, a widget or gadget engine, and or other applications, as necessary) and data files 328 are stored. According to an embodiment, the mobile device 300 includes a power source 330 that provides an appropriate alternating current (AC) or direct current (DC) to power components. According to an embodiment, the mobile device 300 includes and a telephony subsystem 332 that allows the mobile device 300 to transmit and receive sound over a telephone network. The constituent devices and the CPU 302 communicate with each other over a bus 334.

In accordance with various embodiments, the CPU 302 has appropriate structure to be a computer processor. In one arrangement, the computer CPU 302 is more than one processing unit. The RAM 318 interfaces with the computer bus 334 to provide quick RAM storage to the CPU 302 during the execution of software programs such as the operating system application programs, and device drivers.

More specifically, the CPU 302 loads computer-executable process steps from the storage medium 322 or other media into a field of the RAM 318 in order to execute software programs. Data is stored in the RAM 318, where the data is accessed by the computer CPU 302 during execution. In one configuration, the device 300 includes at least 128 MB of RAM, and 256 MB of flash memory.

The storage medium 322 itself may include a number of physical drive units, such as a redundant array of independent disks (RAID), a floppy disk drive, a flash memory, a USB flash drive, an external hard disk drive, thumb drive, pen drive, key drive, a High-Density Digital Versatile Disc (HD-DVD) optical disc drive, an internal hard disk drive, a Blu-Ray optical disc drive, or a Holographic Digital Data Storage (HDDS) optical disc drive, an external mini-dual in-line memory module (DIMM) synchronous dynamic random access memory (SDRAM), or an external micro-DIMM SDRAM. Such computer readable storage media allow the mobile device 300 to access computer-executable process steps, application programs and the like, stored on removable and non-removable memory media, to off-load data from the mobile device 300 or to upload data onto the mobile device 300. A computer program product, such as one utilizing a communication system may be tangibly embodied in storage medium 322, which may comprise a machine-readable storage medium.

Figure 4:
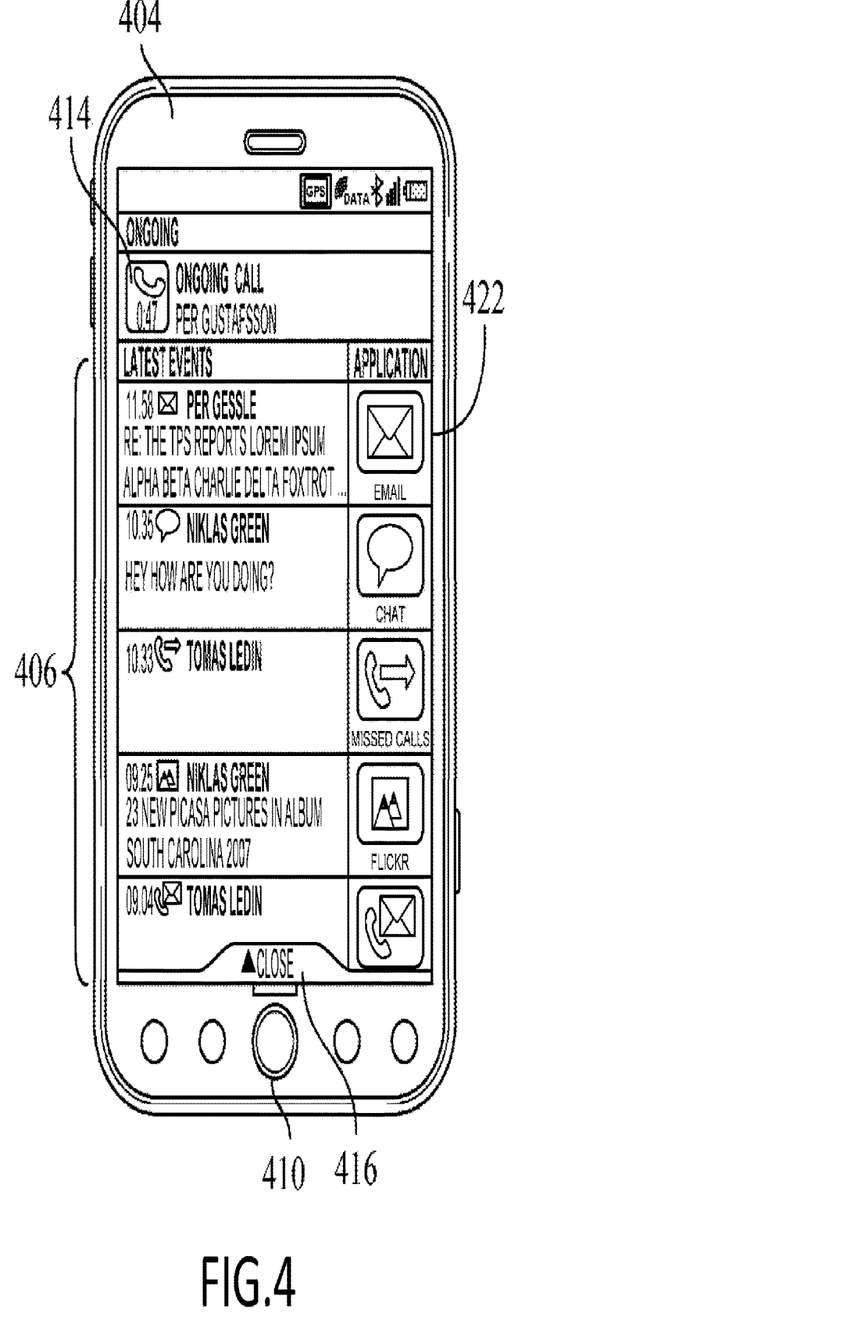
FIG. 4 shows an illustrative mobile device, according to certain embodiments of the disclosed technology.
Figure 5:
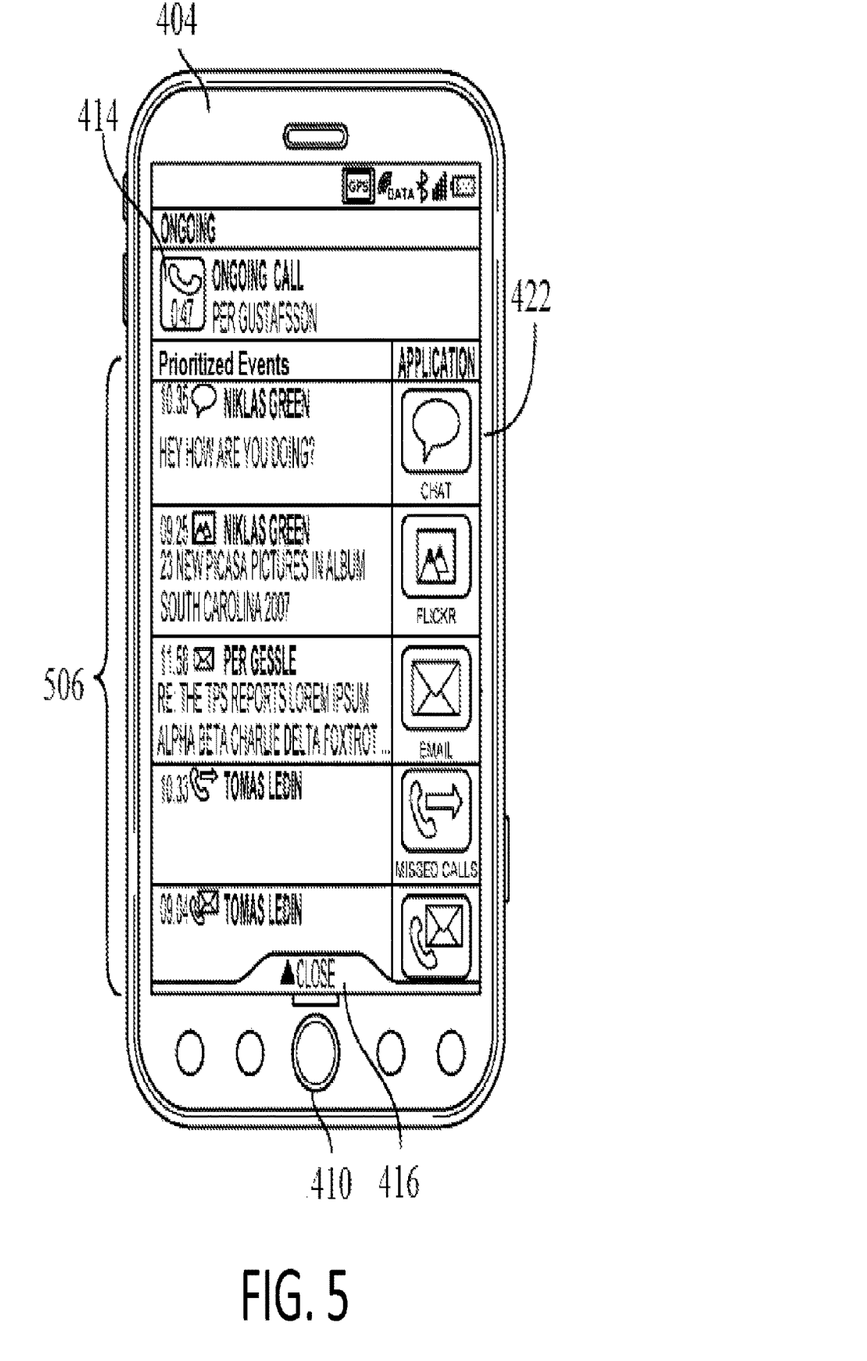
FIG. 5 shows an illustrative mobile device, according to certain embodiments of the disclosed technology.

FIGS. 4-5 show a mobile device exhibiting notification functionality. In FIG. 4, a portion of display 404 has been filled with notification center 406, which is displaying various notifications that were received by the mobile device. Notification icons may also be shown on a status bar; however, since the notification center 406 has been opened, the notification icons on the status bar have been cleared. In this example, the first notification is for an e-mail from Per Gesele, the second is for a chat or text message from Niklas Green, the third is for a missed incoming call from Tomas Ledin, the fourth is for a posting of PICASA photos by Niklas Green, and the fifth is for a voice mail from Tomas Ledin. As shown, these notifications are organized from top to bottom in reverse chronological order. Selection by a user of any of the notifications will cause the corresponding application to be launched or made the focus on the device, with the item corresponding to the selected notification displayed in the application. Alternatively, the user may select an application icon 422 to launch an application associated with a notification.

The user may employ a trackball 410 or may slide their finger upward across the display to scroll down and see any additional messages not currently shown. An active application area 414 is shown above the notification center 406. The active application area 414 shows a reduced-area view of an application that was running in the forefront when the user selected to open the notification center 406; in this example, a telephone call. A "close" tab 416 is shown visually at the bottom of the display 404. When a user selects close tab 416, the notification center 406 will disappear from the display. The close tab 416 may take other forms, and the notification center may also be closed by other means, such as the user dragging upward across it.

FIG. 5 shows an example of the mobile device of FIG. 4 employing an embodiment of the disclosed technology. The system, in this example, has updated the ranking model to provide a greater priority score to notifications associated with Niklas Green than to notifications associated with Per Gessle or Tomas Ledin, since the user has previously selected notifications associated with Niklas Green more often than notifications associated with Per Gessle or Tomas Ledin. The system determined a priority score associated with each notification based on the updated ranking model. The notifications are output based on the determined priority scores. In this instance, the system has graphically emphasized the notifications associated with Niklas Green since they have a greater priority score associated with them than the priority score associated with Per Gessle or Tomas Ledin. Specifically, the notifications associated with Niklas Green were graphically emphasized by changing their position within the listing of notifications which is by default reverse-chronological. As discussed above, the priority score determination may be based, in whole or in part, on various other factors or characteristics; for example, source application.

Certain embodiments of the disclosed technology are described above with reference to block and flow diagrams of systems and methods and/or computer program products according to various embodiments of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain embodiments of the disclosed technology have been described in connection with what is presently considered to be the most practical and various embodiments, it is to be understood that the disclosed technology is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

The patentable scope of certain embodiments of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A method, comprising:
    determining, by a processor and based on a ranking model, a first priority score associated with a first notification and a second priority score associated with a second notification, wherein the ranking model is based at least in part on a plurality of weights, wherein each respective weight from the plurality of weights is associated with a respective characteristic value from a plurality of characteristic values, and wherein the first notification is associated with a first characteristic value from the plurality of characteristic values and the second notification is associated with a second characteristic value from the plurality of characteristic values;
    outputting, by the processor and for concurrent display at a display device, the first notification and the second notification, wherein the first notification is graphically emphasized over the second notification based on the first priority score being greater than the second priority score;
    responsive to receiving, by the processor, an indication of a user selection of the second notification, modifying, based at least in part on the indication, the ranking model by decreasing the respective weight associated with the first characteristic value from the plurality of characteristic values relative to the respective weight associated with the second characteristic value from the plurality of characteristic values;
    determining, by the processor and based on the ranking model, a third priority score associated with a third notification, wherein the third notification is associated with the second characteristic value from the plurality of characteristic values; and
    outputting, by the processor and for concurrent display at the display device, the first notification and the third notification, wherein the third notification is graphically emphasized over the first notification based on the third priority score being greater than the first priority score.

2. The method of claim 1, wherein each respective characteristic value from the plurality of characteristic values represents a value for at least one of source application, sender, time of receipt, and notification content.

3. The method of claim 1, wherein modifying the ranking model is further based on a time at which the indication of user input is received.

4. The method of claim 1, wherein modifying the ranking model is further based on a location of the display device when the indication of the user selection of the second notification is received.

5. The method of claim 1, wherein the second notification and the third notification are a same notification.

6. The method of claim 1, wherein the third notification is represented by a graphic, and wherein graphically emphasizing the third notification comprises enlarging at least a portion of the graphic.

7. The method of claim 1, wherein the first notification, the second notification, and the third notification are each represented by a respective graphic in an ordered list, the relative position of each respective graphic in the ordered list based on the respective priority score associated with the respective notification represented by the respective graphic.

8. The method of claim 1, wherein determining the third priority score is further based at least in part on an orientation of the display device.

9. The method of claim 1, wherein determining the third priority score is further based at least in part on an application currently being accessed at a computing device associated with the processor.

10. The method of claim 1, wherein determining the third priority score is further based at least in part on a last application that was previously accessed at a computing device associated with the processor.

11. The method of claim 1, further comprising requesting explicit user feedback indicative of whether the modifying of the ranking model is correct.

12. A system, comprising:
    at least one memory operatively coupled to a processor and configured for storing data and instructions that, when executed by the processor, cause the processor to perform a method comprising:
        determining, by a processor and based on a ranking model, a first priority score associated with a first notification and a second priority score associated with a second notification, wherein the ranking model is based at least in part on a plurality of weights, wherein each respective weight from the plurality of weights is associated with a respective characteristic value from a plurality of characteristic values, and wherein the first notification is associated with a first characteristic value from the plurality of characteristic values and the second notification is associated with a second characteristic value from the plurality of characteristic values;
        outputting, by the processor and for concurrent display at a display device, the first notification and the second notification, wherein the first notification is graphically emphasized over the second notification based on the first priority score being greater than the second priority score;
        responsive to stopping output of the first notification and the second notification, determining, by the processor, an absence of user interaction with the first notification during display of the first notification and the second notification;
        responsive to determining the absence of user interaction with the first notification, modifying the ranking model by decreasing the respective weight associated with the first characteristic value from the plurality of characteristic values relative to the respective weight associated with the second characteristic value from the plurality of characteristic values;

determining, by the processor and based on the ranking model, a third priority score associated with a third notification, wherein the third notification is associated with the second characteristic value from the plurality of characteristic values; and outputting, by the processor and for concurrent display at the display device, the first notification and the third notification, wherein the third notification is graphically emphasized over the first notification based on the third priority score being greater than the first priority score.

13. The system of claim 12, wherein each respective characteristic value from the plurality of characteristic values represents a value for at least one of source application, sender, time of receipt, and notification content.

14. The system of claim 12, wherein the second notification and the third notification are a same notification.

15. The system of claim 12, wherein the third notification is represented by a graphic, and wherein graphically emphasizing the third notification comprises enlarging at least a portion of the graphic.

16. The system of claim 12, wherein the first notification, the second notification, and the third notification are each represented by a respective graphic in an ordered list, the relative position of each respective graphic in the ordered list based on the respective priority score associated with the respective notification represented by the respective graphic.

17. The system of claim 12, wherein determining the third priority score is further based at least in part on a last application that was previously accessed at a computing device associated with the processor.

18. A non-transitory computer readable medium that stores instructions that, when executed by a computing device, cause the computing device to perform a method comprising:

determining, by a processor and based on a ranking model, a first priority score associated with a first notification and a second priority score associated with a second notification, wherein the ranking model is based at least in part on a plurality of weights, wherein each respective weight from the plurality of weights is associated with a respective characteristic value from a plurality of characteristic values, wherein each notification is represented as a characteristic vector, and wherein the first notification is associated with a first characteristic value from the plurality of characteristic values and the second notification is associated with a second characteristic value from the plurality of characteristic values;

outputting, by the processor and for concurrent display at a display device, the first notification and the second notification, wherein the first notification is graphically emphasized over the second notification based on the first priority score being greater than the second priority score;

responsive to receiving, by the processor, an indication of a user selection of the second notification, modifying the ranking model by decreasing the respective weight associated with the first characteristic value from the plurality of characteristic values relative to the respective weight associated with the second characteristic value from the plurality of characteristic values;

determining, by the processor and based on the ranking model, a third priority score associated with a third notification, wherein the third notification is associated with the second characteristic value from the plurality of characteristic values; and outputting, by the processor and for concurrent display at the display device, the first notification and the third notification, wherein the third notification is graphically emphasized over the first notification based on the third priority score being greater than the first priority score.

19. The method of claim 1, wherein each notification is represented as a characteristic vector, the method further comprising annotating a characteristic vector representing the second notification responsive to receiving, by the processor, the indication of the user selection of the second notification, the annotating reflective of the user selection.

* * * * *